United States Patent [19]

Hiyashi

[11] Patent Number: 5,006,011
[45] Date of Patent: Apr. 9, 1991

[54] FRAMES FOR INSTALLING WOODEN BRICKS

[76] Inventor: Isao Hiyashi, 10-15, Kanesawacho 1-Chome, Hitachi-Shi, Ibaragi 316, Japan

[21] Appl. No.: 541,198
[22] PCT Filed: Jul. 22, 1987
[86] PCT No.: PCT/JP87/00534
    § 371 Date: Sep. 30, 1988
    § 102(e) Date: Sep. 30, 1988
[87] PCT Pub. No.: WO89/00625
    PCT Pub. Date: Jan. 26, 1989

Related U.S. Application Data

[63] Continuation of Ser. No. 273,339, filed as PCT JP87/00534 on Jul. 22, 1987, published as WO89/00625 on Jan. 26, 1989, abandoned.

[51] Int. Cl.$^5$ .............................................. E01C 5/00
[52] U.S. Cl. ........................................ 404/37; 404/40; 52/387
[58] Field of Search ............... 404/37, 40, 43, 44, 404/46, 70, 71, 73; 52/387, 390, 392, 476, 477

[56] References Cited

U.S. PATENT DOCUMENTS

| | | | |
|---|---|---|---|
| 421,742 | 2/1890 | Marsh | 52/387 |
| 658,868 | 10/1900 | Rosenbaum | 52/387 |
| 1,890,954 | 12/1932 | Snyder | 52/390 |
| 2,087,931 | 7/1937 | Wallace et al. | 52/387 |
| 2,293,331 | 8/1942 | Dahlberg | 52/387 |
| 2,703,004 | 3/1955 | Kenedy | 52/477 |
| 3,162,906 | 12/1964 | Dudley | 52/477 |
| 3,238,682 | 3/1966 | Tracy et al. | 404/37 |
| 3,824,753 | 7/1974 | Anderson | 52/476 |
| 3,832,078 | 8/1974 | Nakayama | 404/44 |
| 3,859,768 | 1/1975 | Donzis | 52/476 |
| 4,671,699 | 6/1987 | Roach | 404/40 |

*Primary Examiner*—Ramon S. Britts
*Assistant Examiner*—Gay Ann Spahn
*Attorney, Agent, or Firm*—Wenderoth, Lind & Ponack

[57] ABSTRACT

The present invention relates to a frame for installing wooden bricks in which plural sections for holding the wooden bricks are arranged so as to correspond to the finished arrangement of the wooden bricks, a pederal for fixing the wooden bricks is prepared in each holding section, and a piece of elastic protrusion is protruded from a section wall of each holding section into an oblique downward direction in the section, or a frame for installing wooden bricks in which, in addition to the above, on a wide joint means between each holding section, plural elastic projections having the same level to the upper surface of the wooden bricks the upper end of which is held in the holding section are prepared, by holding the wooden bricks which have corresponding size and shape to the holding sections and by installing the wooden bricks on sidewalks and the like, the pavement of wooden bricks having smooth road may be very easily obtained.

Further, the pavement of wooden bricks having water permiability and permitting the expansion and contraction may be obtained.

8 Claims, 10 Drawing Sheets

FRAMES FOR INSTALLING WOODEN BRICKS

This application is a continuation of now abandoned application Ser. No. 07/273,339 filed as PCT JP87/00534 on Jul. 22, 1987, published as WO89/00625 on Jan. 26, 1989.

TECHNICAL FIELD

The present invention relates to frames for installing wooden bricks with which roads through parks, pavements along public roads, road surfaces of parking places, roads used in meeting places to be held entertainment temporarily, and other roads are paved. The wooden bricks are installed on the ground of the said roads and held with the frames, and pavement of wooden bricks is built.

BACKGROUND ART

Hitherto, pavements used wooden bricks are sometimes observed in malls where pedestrians can freely walk, on roadways at special time, in parks, in gardens and the like.

Such pavement of wooden bricks are installed by the following methods.

In the first method, the ground is almost leveled by coating void kneading mortar, wooden bricks are placed on the ground at suitable spaces, and the wooden bricks are evenly knocked with a wooden hammer and the like to level the surface of the wooden bricks and to cover some of the lower part of the wooden bricks with the mortar. Molten asphalt is then poured into each joint of the wooden bricks, the asphalt is hardened, and sand is put on the asphalt.

In the second method, asphalt primer is applied on the concrete ground which is evenly finished by coating with leveling mortar, a solution of blown asphalt is applied on the ground before plural wooden bricks are placed on the ground at suitable spaces in good order one by one, the solution of blown asphalt is then poured into each joint of the wooden bricks, the asphalt is hardened to obtain joint completion. In this method, when the wooden bricks are installed on the ground, there is no doubt that the wooden bricks should be evenly knocked with a wooden hammer and the like to level the surface of the wooden bricks.

However, these methods for installing the wooden brick pavement have many problems and cannot fit for practical use. Operations for installing the wooden bricks in the first and the second methods described above are conducted by placing many wooden bricks one by one and by knocking the surface to arrange the bricks, so that the operations are extremely inefficient. Furthermore, it is difficult to obtain the flat surface of the pavement. As the wooden bricks are arranged by eye measurement, there is a problem in which it is difficult to make even the joint width between each wooden brick.

Moreover, in the usual installation of wooden bricks as described above, as the wooden bricks are fixed on the ground with mortar or asphalt and joints are fixed with mortar or asphalt, rainwater and the like cannot permeate underground, and there is a problem in which pools are easily formed on the wooden brick pavement. As the result, corrosion of the wooden bricks is induced. Furthermore, as the wooden bricks are fixed with asphalt and the like as described above, the change of expansion of the wooden bricks caused by containing water and contraction of the dehydrated wooden bricks cannot be absorbed.

Thereupon, it has been disclosed that plural wooden bricks are arranged in fixed order, and wooden bricks are joined together by filling joint materials such as asphalt, acryl type rubber, urethane type rubber and the like between their gaps to form the board like complex of wooden bricks (Unexamined Publication of Japanese Patent Application Number, 59(1984)–(1006).

Furthermore, it has been disclosed that plural wooden bricks are joined together to arrange in a row as described above by using joint materials which are obtained by mixing resin and rubber chips, and the joints have apertures passing through the both sides (Unexamined Publication of Japanese Utility Model Application Number, 61(1986)–19(2010).

However, problems of the former method are that the joint materials have no water permeability when roads and the like are paved by this method, rainwater and the like cannot permeate underground, and pools are easily formed on the wooden brick pavement, as the result, the wooden bricks are corroded. Further, as the joint materials cannot keep sufficient pliability, the method cannot enough coped with the expansion and contraction of wooden bricks caused by humidity changes. There is also a very important problem in which the process for attaching the wooden bricks to the joint materials is difficult.

The latter method is aimed to settle the problem of water permeability, however, so far as the above constitution is concerned, it will be practically difficult to keep the water permeability, and the joint process of wooden bricks with joint materials is difficult like the former method.

Accordingly, an object of the present invention is to provide a frame for installing wooden bricks which is separated from the wooden bricks and can easily fit to the wooden bricks.

Another object of the present invention is to provide a frame for installing wooden bricks which can enough coped with the expansion and contraction of wooden bricks caused by humidity change when the wooden bricks are held to the frame to install on a sidewalk and the like.

Furthermore, another object of the present invention is to provide a frame for installing wooden bricks which can keep water permeability when the wooden bricks are held to the frame to install on a pavement and the like.

The other object of the present invention is to provide a frame for installing wooden bricks in which splits of the wooden bricks can be prevented by flexibly fixing the bricks so as to admit their deformation in a certain extent, when the wooden bricks are held to the frame to install on a road and the like, even though the road is pressed by pedestrians or cars.

Additionally, another object of the present invention is to provide a frame for installing wooden bricks having a means which can fill up wide joint gaps between the wooden bricks, because the gaps are produced by uneven plane configuration of the wooden bricks to be held.

DISCLOSURE OF INVENTION

The first invention is a frame for installing wooden bricks in which plural sections for holding the wooden bricks are arranged so as to correspond to the finished arrangement of the wooden bricks, a means for fixing the wooden bricks is prepared in each holding section, and a piece of elastic protrusion is protruded from a section wall of each holding section into an oblique downward direction in the section.

The second invention is a frame for installing wooden bricks in which plural sections for holding the wooden bricks are arranged so as to correspond to the finished arrangement of the wooden bricks, a means for fixing the wooden bricks is prepared in each holding section, a piece of elastic protrusion is protruded from a section wall of each holding section into an oblique downward direction in the section, and, on a wide joint means between each holding section, plural elastic projections having the same level to the upper surface of the wooden bricks the upper end of which is held in the holding section are prepared.

The above holding sections can be constituted in several kinds of size and configuration corresponding to the wooden bricks to be held. As the plane configuration of wooden bricks, a quadrangle such as a square and a rectangle, a circle and the like are common, so that the holding sections can be constituted so as to hold the wooden bricks having a kind of configuration or combination of plural kinds of configuration in appropriate arrangement.

As an example, when the plane configuration of the aimed wooden bricks are a square, plural holding sections, such as nine holding sections are constituted in three perpendicular and three lateral lines, respectively. In this case, by forming section plates of lattice, the holding sections can be constituted in the perpendicular and lateral arrangement as described above. In such constitution, each corresponding part of the above section plate is a section wall of each holding section, the section wall is owned jointly at the adjacent holding sections. This is a fundamental arrangement of the wooden bricks.

For example, an installing frame in which holding sections of wooden bricks having plane circular configuration are arranged in perpendicular and lateral lines as described above can be constituted. In this case, the section wall is constituted in a plane ring-shaped surrounding wall. The outer circumference of the wall is connected with outer circumference of an adjacent section wall by using a suitable connection means. The suitable connection means is a connection plate which is integrally molded with the section wall.

Furthermore, for example, an installing frame can be constituted by arranging about three lines of holding sections which hold wooden bricks having plane rectangular form so a to contact at the longitudinal side.

Then, the above means for fixing the wooden bricks also can be mainly constituted by a holder on which the wooden bricks are placed. This holder is constituted as a stand which is partly standing up from the lowest part of the holding section. Further, the holder is constituted so as to have a little high edge on the upper surface. The inside of the holder has relatively a little low plane part. One or about two screw holes passing through two sides of the inside plane part are made. Furthermore, preferably, one or more small holes are made around the hole. When the holding section has a plane configuration of a square or a circle, a holder is suitably constituted in the center. When the holding section has a plane configuration of a rectangle or the like, plural holders are suitably arranged at proper interval in proportion to the length. Then, the above holder is constituted so as to be held by plural arms which extend near the lower part of the section walls of the holding section.

Moreover, plates for preventing sinking of wooden bricks may be horizontally projected at the lower inside of the above section walls, around the lower part of the holder and at the lower sides of the above arms.

Further, the above protrusion piece is constituted, for example, in the downward direction from the top of section walls to the section inside and, as described above, into an oblique downward direction. The angle between the protrusion piece and the section wall is not particularly limited, suitably about 25°–35°. The width of the protrusion piece is not particularly limited, suitably ⅛–¼ of the thickness of the wooden brick. Commonly, the thickness is about 9–13 mm. The above protrusion piece is aimed to hold and elastically bind the wooden brick by contacting the lower edge of the protrusion piece to the outer circumference of the wooden brick which is inserted in the holding section. The above protrusion piece has, if necessary, a notch for penetrating water at suitable intervals. When rainwater and the like are penetrated between the installed wooden bricks, the notch can act to flow the water on the ground, and the water can be penetrated underground by constituting the ground of water penetration. As the rainwater and the like cannot stay around the wooden bricks by such constitution, their corrosion and the like can be prevented.

Furthermore, in the second invention elastic projections are especially prepared on the wide connection means between the holding sections. The projections are especially used for the installing frames which hold wooden bricks having plane circular configuration. In this case, it is inevitable to form, at least in part, a wide gap between the holding sections. In the above gap, the connection means for connecting the adjacent holding sections, for example the connecting plate, is constituted, and plural elastic projections are prepared on the connection means. These elastic projections are constituted in pipe form passing through the plate, and the form is suitable from the point of view of water penetration.

Further, around the installing frames of wooden bricks, in any case, male and female joining means are, if necessary, constituted for joining the adjacent objects when the bricks are installed.

Moreover, these installing frames are suitably formed by using plastic materials having enough strength. As the materials, polypropylene and the like are suitable.

The installing frames of this invention are constituted as described above and can be used for pavements such as sidewalks by holding wooden bricks as follows. The wooden bricks are previously applied antiseptic treatment.

At the beginning, the wooden bricks having plane configuration are inserted into each of the holding sections as expected. The wooden bricks are inserted by pressing from the top in the installing frame which is placed upward. As the protrusion pieces are constituted obliquely downward at the surrounding walls of the holding sections and elastically, when the wooden bricks are pressed into the holding sections as described above, with the bricks descending, the protrusion pieces go back to the section walls and the wooden bricks are smoothly inserted into the holding sections. If dimensions of the wooden bricks are slightly larger or smaller, some difference of the dimensions are absorbed by the above protrusion pieces. For example, even if the dimensions of the wooden bricks are slightly larger and the wooden bricks cannot be easily pressed, the bricks are struck with a wooden hammer and the like.

After the wooden bricks are inserted in the whole holding sections of the installing frame, for example, when a fixing means is constituted as a holder having a vis hole as described above, the installing frame is turned inside out, a vis is inserted in the vis hole and screwed on the lower part of the wooden brick. This operation can be efficiently conducted by using an electric driver and the like.

By repeating such insertion work of the wooden bricks, necessary numbers of each wooden brick can be inserted in each holding section of the installing frame and fixed.

Then, the installing construction of a necessary installing zone such as a sidewalk and the others begins by building a suitable groundwork of gravel, concrete and the like.

The above gravel ground is smoothly finished by digging the necessary zone about 300 mm deep, graveling and pressing the zone sufficiently. Further, the digging depth is not limited to the above value. The concrete ground can be obtained by digging the necessary zone similarly, concreting the zone by a general method and smoothly finishing the surface.

On the gravel or concrete ground as described above, the installing frames holding the above wooden bricks are provided perpendicularly and laterally. When joining means are constituted around the installing frames, the adjacent installing frames are mutually joined by these joining means. By conducting such operations throughout the necessary zone, the installation is finished.

Accordingly, the smooth pavement of wooden bricks can be very easily and efficiently conducted by a non-professional by continuously joining the installing frames.

Furthermore, as the wooden bricks installed as described above are inserted in the holding sections of installing frames and the surrounding sides are held by protrusion pieces which are protruded from the section walls, the wooden bricks can advantageously act in many ways even after the installation.

Firstly, as the above protrusion pieces have elasticity, these pieces can absorb expansion and contraction of wooden bricks caused by humidity change.

Secondly, as the wooden bricks are elastically held by the protrusion pieces as mentioned above, even if various shocks are given from the outside by running cars or by walking pedestrians on the installing road surface, the deformation of wooden bricks is within the limits of retreat of the protrusion pieces, so that the deformation beyond the limits is prevented and especially cracks which are easily caused along the grain of a corner and the like are prevented.

In the pavement of wooden bricks installed in such a manner, water permeability can be secured.

The above description is applied to both the first and the second inventions. In the second invention, when a bigger gap is formed between the holding sections, especially when the installing frames contain the holding sections of wooden bricks having plane circular configuration, this constitution is very useful. Namely, as many elastic projections are provided on the connection means between the holding sections, even if a gap is formed, it is able to walk or run on the bricks without the least inconvenience. As described above, when the elastic projections are shaped into a tube, water permeability becomes good.

BRIEF DESCRIPTION OF DRAWINGS

FIG. 1 is a plan view thereof, FIG. 2 is a section taken on line A—A in FIG. 1, FIG. 3 is a plan view which showing a condition in which wooden bricks are held, FIG. 4 is a section taken on line B—B in FIG. 3, FIG. 5 is a portion broken sectional view showing a condition in which installing frames holding the wooden bricks are joined by a joining means each other, FIG. 6 is a portion broken and enlarged sectional view showing a condition in which the installing frames holding the wooden bricks are provided on a gravel ground, and FIG. 7 is a portion broken and enlarged sectional view showing a condition in which adjacent installing frames are joined by a joining means, and the installing frames hold the wooden bricks and are provided on a gravel ground.

FIG. 8 is a plan view thereof, FIG. 9 is a section taken of line C—C in FIG. 8, FIG. 10 is a section taken on line D—D in FIG. 8, FIG 11 is a plan view showing a condition in which wooden bricks are held by installing frames, FIG. 12 is a section taken on line E—E in FIG. 11, and FIG. 13 is a section taken on line F—F in FIG. 11.

FIG. 14 is a plan view thereof, FIG. 15 is a section taken on line G—G in FIG. 14, FIG. 16 is a section taken on line H—H in FIG. 14, FIG. 17 is a plan view showing a condition in which wooden bricks are held by installing frames, and FIG. 18 is a section taken on line I—I in FIG. 17.

BEST MODE FOR CARRYING OUT THE INVENTIONS

Figure 1:
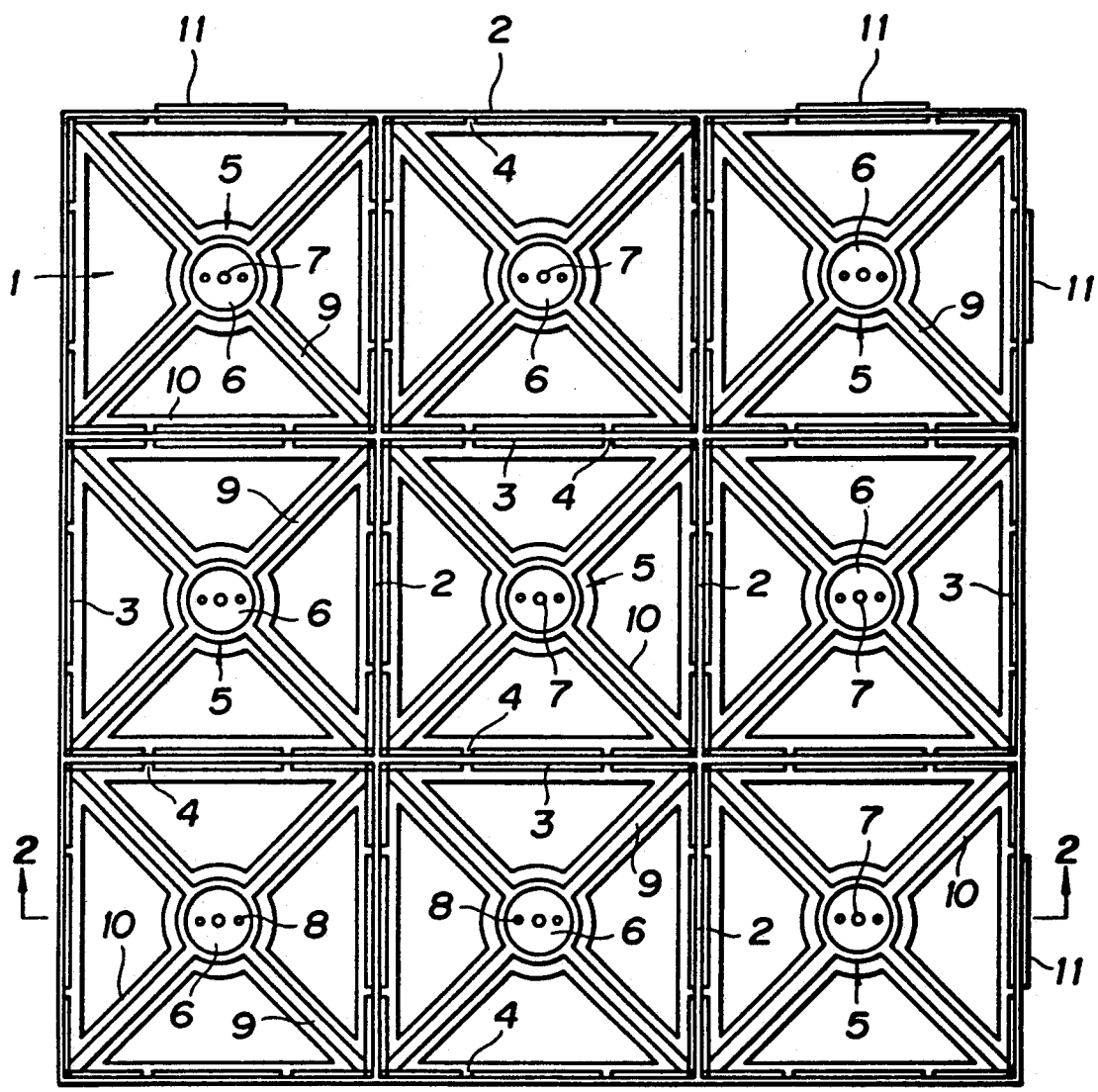
FIGS. 1 to 7 show the first working example of one of the present inventions.

For illustrating the present inventions more specifically, examples are described below while referring to the drawings.

The first example of one of the present inventions is explained.

As shown in FIG. 1, an installing frame in which nine holding sections 1, 1 . . . having plane squares are arranged in three perpendicular and three lateral lines is constituted.

The above holding sections 1, 1 . . . are surrounded by section walls 2, 2, 2, 2, these section walls 2, 2 . . . are constituted in common with those of mutual adjacent holding sections 1, 1, respectively, and the section walls 2, 2 . . . which are situated so as to form the outer walls of the installing frame are constituted in common with the outer walls of the installing frame. Accordingly, the holding sections 1, 1 . . . are constituted in lattice sections which are constituted by a group of three section walls 2, 2, 2 which are arranged in four perpendicular lines and a group of three section walls 2, 2, 2 which are arranged in four lateral lines.

Further, in the above section walls 2, 2 . . . , the walls in common with the outer walls of the installing frame are formed in 2 mm thick and the other walls are formed in 4 mm thick. In this case, as described later, when installing frames holding wooden bricks b-1, b-2 are jointly arranged at a certain area, the distance between the wooden bricks b-1, b-1 which are contacted at the mutual adjacent outer wall of the installing frame becomes equal to the distance between the wooden bricks b-1, b-1 in the installing frame.

Figure 3:
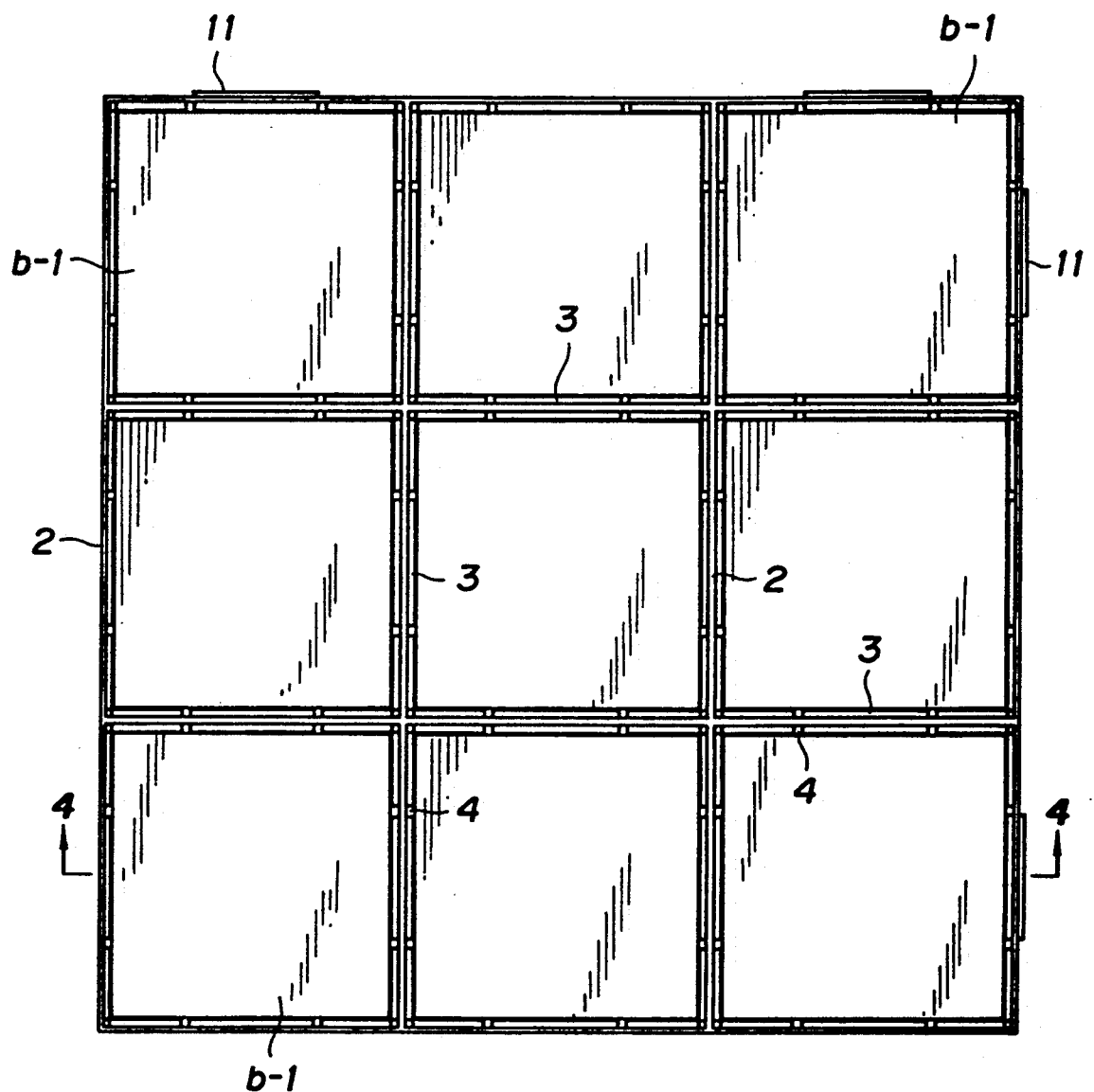

Then, the above installing frame, as shown in FIG. 1 and FIG. 3, is constituted in a plane square having a side of 330 mm and a height of 40 mm. The sides of the above holding sections 1, 1 . . . are 110 mm long. Further, the latter length shows distance between the central points of the section walls 2, 2 on both sides. Concerning the distance from the section wall 2 in common with the outer wall of the installing frame to the inside section wall 2, the distance from the side in common with the outer wall does not show the distance from the central point but shows the distance from the outside.

Figure 2:
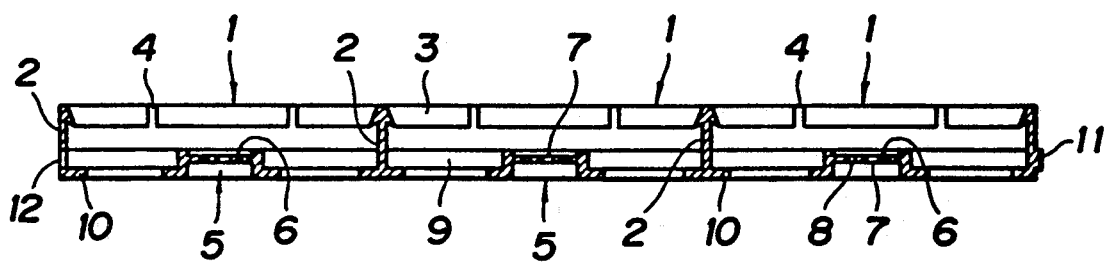

As shown in FIGS. 1 to 3, protrusion pieces 3, 3 are protruded from the upper end of the section walls 2, 2 . . . of four sides of the above holding sections 1, 1 . . . into oblique inside and downward directions of the sections by having little openings at the both sides. The angle between the protrusion pieces and the section walls 2, 2 . . . is about 30°. The above protrusion pieces 3, 3 . . . have a protruded width of 10 mm. As the result, the above protrusion pieces 3, 3 . . . extend to the inside of the holding sections 1, 1 . . . in 5 mm wide. Further, the above protrusion pieces 3, 3 . . . have notches 4, 4 for penetrating water at two places, respectively.

Figure 4:
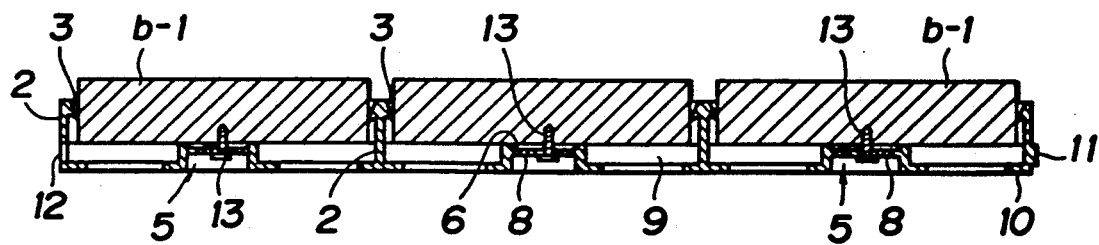

Moreover, at the central lower part of the above holding sections 1, 1 . . . especially as shown in FIG. 1, FIG. 2 and FIG. 4, a holder 5 of each wooden brick is arranged, respectively. The above holders 5, 5 . . . are formed in a circle stand by standing up from the bottom of the holding sections 1, 1 . . . in 10 mm high. Then, the top of the holders 5, 5 . . . has a circular plane part 6 inside of the surrounding edge in 1 mm high, respectively. At the center of the above circular plane part 6, 6 . . . , a vis hole 7 is formed so as to pass through two sides of the plane part. Further, around the vis hole, two little binding holes 8, 8 are made in a straight line with the above vis hole 7. The above holder 5, as shown in FIG. 1, is held by extending each arm 9 from four inner corners of the holding section 1.

Moreover, around the lower part of the above holders 5, 5 . . . , on both sides of the lower part of the above arms 9, 9 . . . and at the lower inside of the above section walls 2, 2 . . . a protrusion 10 for preventing sinking of wooden bricks is horizontally projected, respectively.

Then, as shown in FIG. 1 and FIG. 2, on two adjacent sides which contain an angle and belong to four sides of the outer walls of the installing frame, two joining projections 11, 11 are protruded, respectively, and on the other two sides, joining holes 12, 12 corresponding to the above joining projections 11, 11 are constituted, respectively. The joining projections 11, 11 of the side are formed on the section walls 2, 2 of the holding sections 1, 1 which are situated at corners of the installing frame. They are naturally constituted on the section walls 2, 2 in common with the same outer wall of the installing frame. As shown in FIG. 2, FIG. 4, FIG. 5 and FIG. 7, the joining projections 11, 11 are projected from the outer walls of the installing frame so as to be situated slightly above the thickness of the protrusions 10, 10 . . . for preventing sinking of wooden bricks. The projection width is about 4 mm, slightly wider than the thickness of the outer wall, namely 2 mm. The thickness in a height direction is about 6 mm. Besides, as shown in FIG. 1 and FIG. 3, the length of the direction along the outer walls of the above joining projections 11, 11 . . . is determined to almost the same as the length between the notches 4, 4 for penetrating water of the protrusion pieces 3, 3 . . . , namely about 45 mm.

In addition, the above joining holes 12, 12 of the side of the outer wall of the installing frame correspond to the above joining projections 11, 11, and they are constituted on the section walls 2, 2 of the holding sections 1, 1 which are situated at corners of the installing frame. As shown in FIG. 2, FIG. 4, FIG. 5 and FIG. 7, the joining holes 12, 12 are made at the outer walls of the installing frame so as to be situated above the thickness of the protrusions 10, 10 . . . for preventing sinking of wooden bricks. The height from the hole bottom of the joining holes 12, 12 is slightly above 6 mm. Then, the length of the direction along the outer walls of the above joining holes 12, 12 is almost the same as the length between the notches 4, 4 for penetrating water of the protrusion pieces 4, 4, namely slightly above 45 mm.

Furthermore, the above whole constitution elements are integrally molded out of plastics which are obtained by mixing a main polypropylene material, and a weathering agent and the like.

In this embodiment, as the installing frame is constituted as described above, as explained in the following, the frame can be used for the pavement of sidewalks and the like by holding the wooden bricks b1, b-1 . . . having plane square configuration to the holding sections 1, 1 . . . . Considering the size of the above installing frame, the wooden bricks b-1, b-1 which are formed in plane square shape having a side of 100 mm and a height of 40 mm are suitable for the holding object. Moreover, the above wooden bricks b-1, b-1 are naturally applied antiseptic treatment by permeating an antiseptic or by the other method.

Before the installing frame is installed on sidewalks and the like, the wooden bricks b-1, b-1 . . . are inserted and held in the holding sections 1, 1 . . . , respectively.

The wooden bricks b-1, b-1 . . . , as shown in FIG. 1, are placed upward, and successively pressed in the holding sections 1, 1 . . . from the top. As the protrusion pieces 3, 3 . . . of the section walls 2, 2 . . . , especially as shown in FIG. 2, FIG. 4, FIG. 5, FIG. 6 and FIG. 7, are constituted obliquely downward and they are molded out of plastics of which a main material is elastic polypropylene, with the pressing action of the wooden brick b-1 as described above, the lower edge goes back to the section walls 2, 2 . . . , and the wooden brick b-1 is smoothly inserted. When the insertion is a little hard, the brick can be struck with a wooden hammer and the like. By repeating this operation in the numbers of the holding sections 1, 1 of each installing frame, the wooden bricks b-1, b-1 can be inserted in each installing frame.

Subsequently, the installing frame in which the insertion of the wooden bricks b-1, b-1 in the holding sections 1, 1 . . . are finished is turned inside out, a vis 3 is inserted in the vis hole 7 from the back of each of the holders 5, 5 . . . to screw on the wooden brick b-1 from the back, and the wooden brick b-1 is fixed on the holder 5. It is efficiently conducted by an electric driver to screw the vis 13 on the wooden brick b-1. FIG. 3 shows the installing frame in which the wooden bricks b-1, b-1 . . . are held in the holding sections 1, 1 . . . , as described above. FIG. 4 shows a condition in which the wooden bricks b-1, b-1 . . . are fixed on the holder 5, 5 . . . by the vis 13, 13 . . . .

The installation of sidewalks and the like is conducted by building the groundwork of gravel or concrete.

In this embodiment, the gravel ground is built and the frames are installed on a sidewalk in a park.

This gravel ground 14 is smoothly finished by digging down a certain zone in a depth of about 30 cm, graveling and pressing the zone sufficiently.

Figure 5:
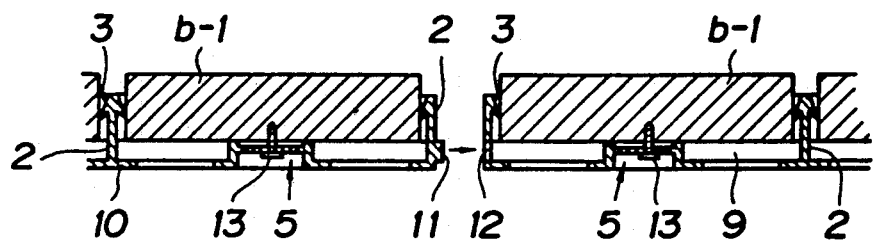
Figure 6:
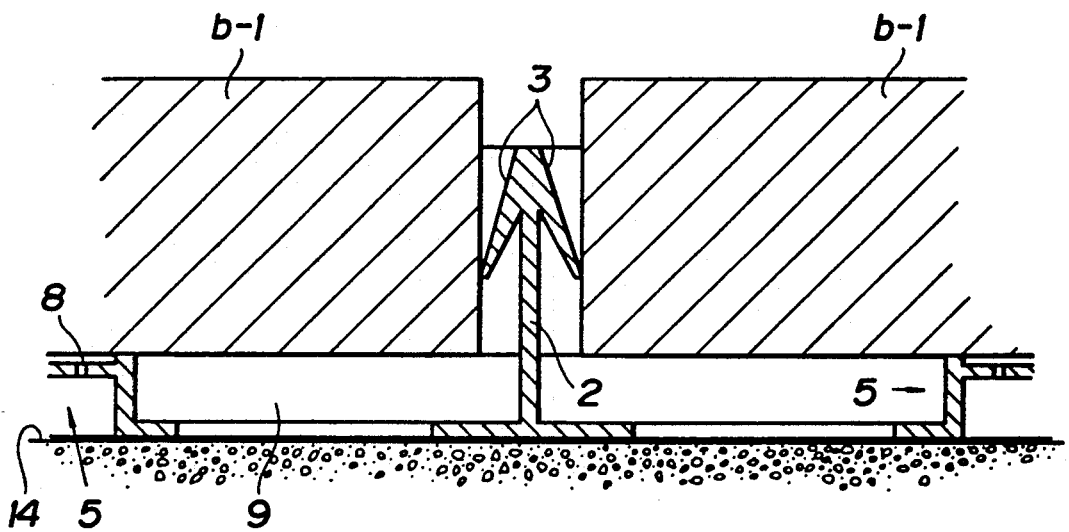
Figure 7:
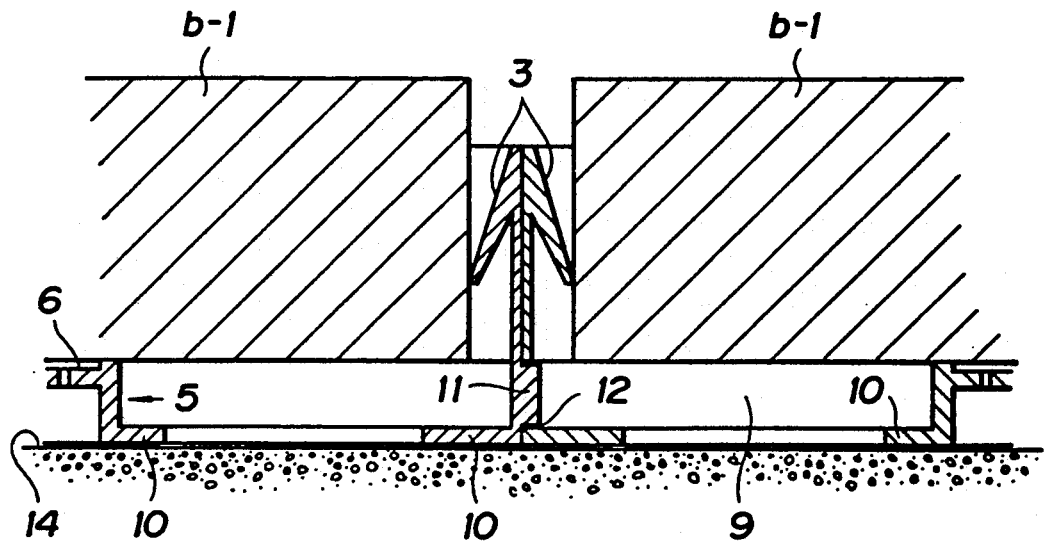

On the above gravel ground 14, the installing frames in which the above wooden bricks b-1, b-1 . . . are held are arranged perpendicularly and laterally. This work is conducted by arranging the installing frames on the gravel ground 14 while the adjacent installing frames are connecting each other. The adjacent installing frames are mutually connected, for example, as shown in FIG. 5, by progressing one of the installing frames to the other installing frame as shown by an arrow, and by fixing the joining projections 11, 11 of the outer wall of one of the installing frames in the joining holes 12, 12 of the other installing frame. When the installing work is conducted throughout the fixed zone while the adjacent installing frames are mutually joined as described above, the construction is completed. In this way, the smooth pavement of the wooden bricks b-1, b-1 . . . can be completed by simple operation by which the installing frames are continuously arranged. FIG. 6 shows a part of the installing frame provided on the gravel ground 14 after the wooden bricks b-1, b-1 are held. Further, FIG. 7 shows a mutually connected part of the adjacent installing frames which are laid on the gravel ground 14.

Still more, it is not necessary to insert a filler in the joint between the wooden bricks which are installed by the installing frame, but if necessary, it is able to fill the joint with sand and the like. However, when the filler is inserted in the joint, it is necessary to investigate well the property of the filler so as to keep water permeability.

By the way, in the wooden bricks b-1, b-1 . . . which are installed as described above, as shown in FIG. 3 and FIG. 4, as the surrounding sides are held at the lower edges of the protrusion pieces 3, 3 . . . which are obliquely and downward protruded from the section walls 2, 2 . . . of the holding sections 1, 1 . . . and as the protrusion pieces 3, 3 . . . themselves have elasticity, these pieces can absorb expansion and contraction of wooden bricks b-1, b-1 . . . caused by humidity changes. Further, as the deformation of the wooden bricks b-1, b-1, . . . is limited in the ranges of the holding sections 1, 1 . . . , even if various shocks are given from the outside by running cars or by walking pedestrians on the installed road surface, cracks which are easily caused along the grain are prevented.

Further, in the pavement of the wooden bricks b-1, b-1 . . . using the above installing frame, as notches 4, 4 for penetrating water are formed on the protrusion pieces 3, 3 . . . which are provided on the section walls 2, 2 . . . of the installing frame, rainwater and the like can flow on the gravel ground 14 through these notches. As the gravel ground 14 is naturally water penetration, rainwater and the like can be penetrated underground.

When a part of the wooden brick b-1 installed in the installing frame is damaged, the damaged wooden brick b-1 can be changed as follows.

Firstly, a bar tip, a chisel tip, an edged tool and the like are thrust on the surface of the damaged wooden brick b-1, the wooden brick b-1 is cracked by striking their back with a hammer and the like, the vis 13 is loosened and the brick is taken out from the holding section 1. Then, the above vis 13 which is exposed on the surface of the holder 13 is struck down on the side of the gravel ground 14. After that, a binding agent is applied on a plane circular part 6 of the holder 5, and a new wooden brick b-1 is inserted in the said holding section 1. Thus, the binding agent adheres to the back of the wooden brick b-1, the wooden brick b-1 and the holder 5 are adhered and fixed in the holding section 1. The adherence of the binding agent to the plane circular part 6 is strengthened by overflowing excess binding agent from the back of the holder 5 through the little binding holes 8, 8, and by solidifying the overflowed binding agent in a globular shape having a longer diameter than the inside diameter of the little binding holes 8, 8.

Then, the second example of one of the present inventions is briefly explained.

Figure 8:
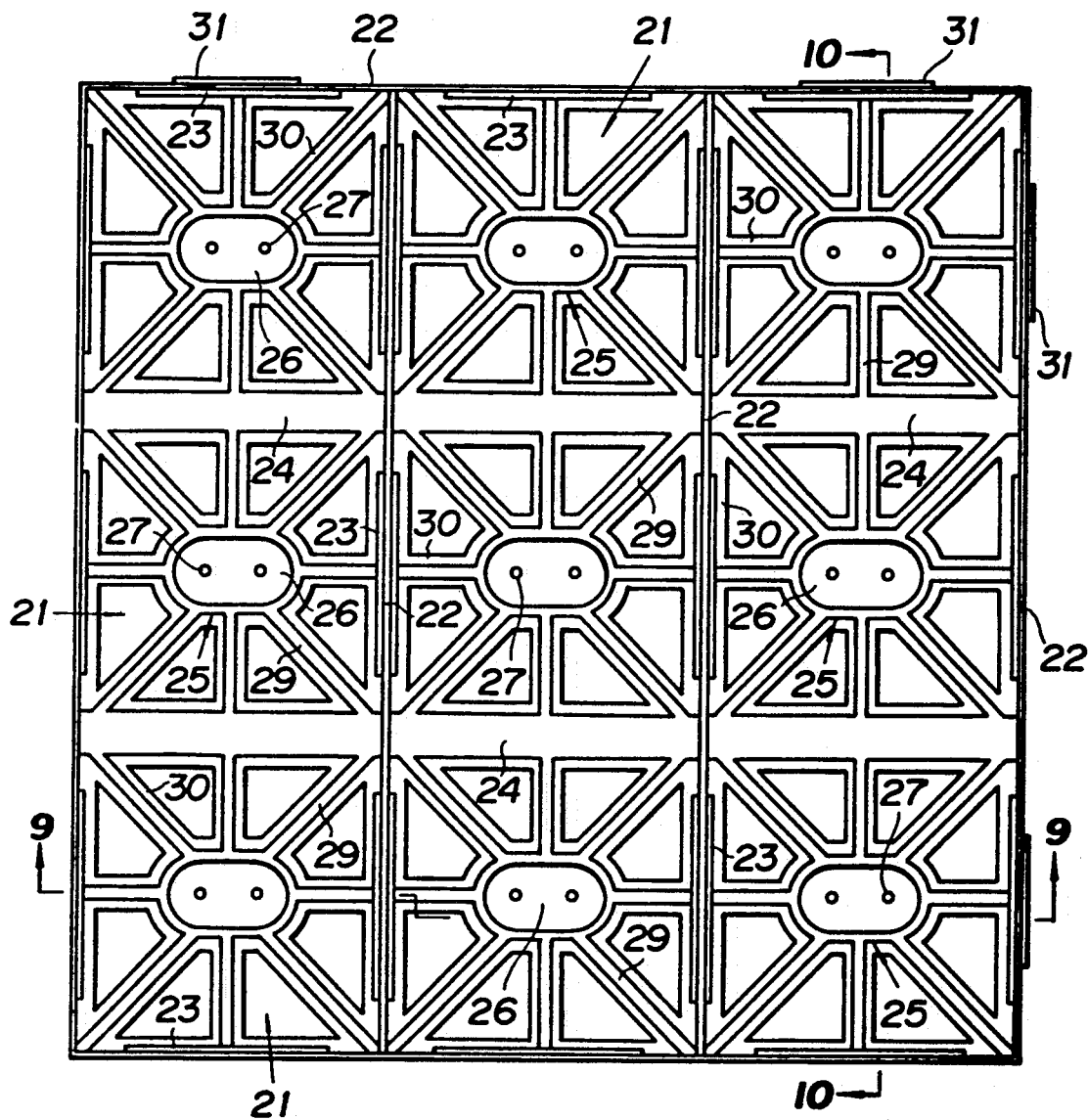
FIGS. 8 to 13 show the second working example of one of the present inventions.

As shown in FIG. 8, an installing frame having a plane square is constituted by arranging three lines of holding sections 21, 21, 21 having plane rectangular forms.

The above holding sections 21, 21, 21 are surrounded by section walls 22, 22 . . . , the section wall 22 between the mutual adjacent holding sections 21, 21 is constituted in common, and the section walls 22, 22 . . . which are situated so as to form the outer walls of the installing frame are constituted in common with the outer walls of the installing frame.

Further, the above section walls 22, 22 which are constituted in common with the outer walls of the installing frame have a thickness of 2 mm and the other section walls 22, 22 have a thickness of 4 mm which is twice of the above thickness. As described later, when installing frames which hold wooden bricks b-2, b-2 having plane rectangular forms are jointly arranged at a certain area, the distance between the wooden bricks b-2, b-2 which are contacted at the mutual adjacent outer wall of the installing frame becomes equal to the distance between the wooden bricks b-2, b-2 in the installing frame.

Figure 11:
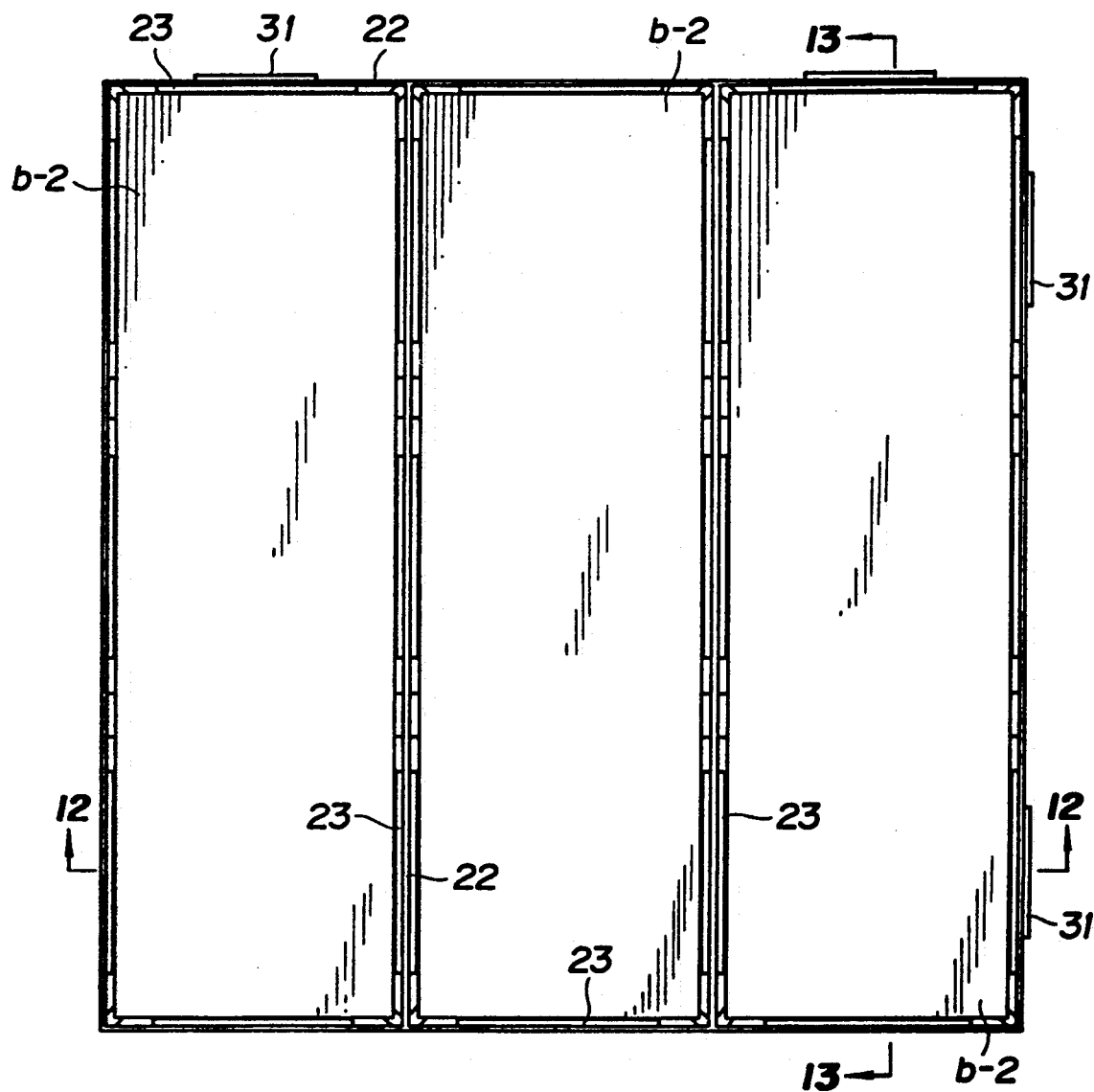

Then, the above installing frame, as shown in FIG. 8 and FIG. 11, is constituted in a plane square having a side of 330 mm and a height of 40 mm. The length of short sides of the above holding sections 21, 21 . . . is 110 mm and the length of their long sides is 330 mm. Further, in the above size, the short sides show the distance from the center of one side of the section wall 22 to the center of the other side of the section wall 22. Concerning the size of the section wall 22 which is in common with the outer wall of the installing frame and the inside section wall 22, the distance from the side in common with the outer wall does not show the distance from the center but the distance from the outside. Concerning the long sides, it shows the distance from the outside of outer wall to the outside of the other outer wall. Namely, this size is equal to the size of a side of the installing frame.

As shown in FIGS. 8 to 12, a protrusion piece 23 are protruded downward in the section from the short side and three protrusion pieces 23, 23, 23 are protruded from the long side of four section walls 22, 22 . . . of the above holding sections 21, 21 . . . , respectively. The length of the protrusion pieces 23, 23 . . . is 70 mm in the direction of walls and the width is 10 mm in the protrusion direction. The angle between the protrusion pieces and the section walls 22, 22 . . . is 30°. Accordingly, the length of protruded lower part is usually about 5 mm in the section. Then, the protrusion piece 23 of the short side is situated in the center of the section wall 22. Openings of 20 mm are left at the both sides. Moreover, in the long side, one protrusion piece 23 is arranged in the center of the section wall 22 and each protrusion piece 23 is arranged at the both sides in the distance of 40 mm, respectively.

Figure 10:
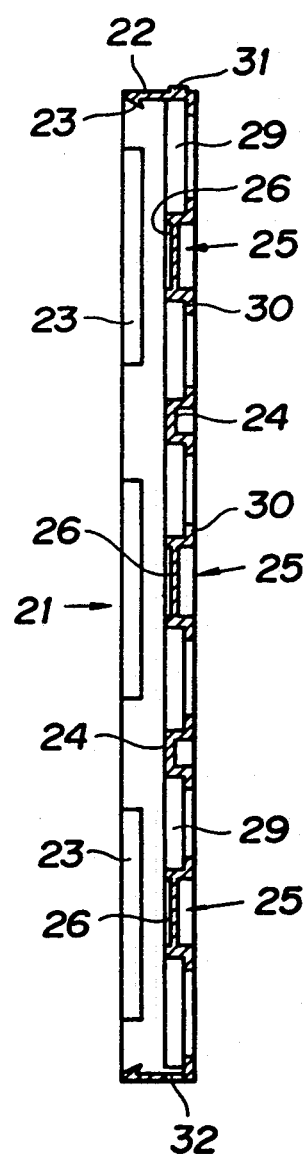
Figure 13:
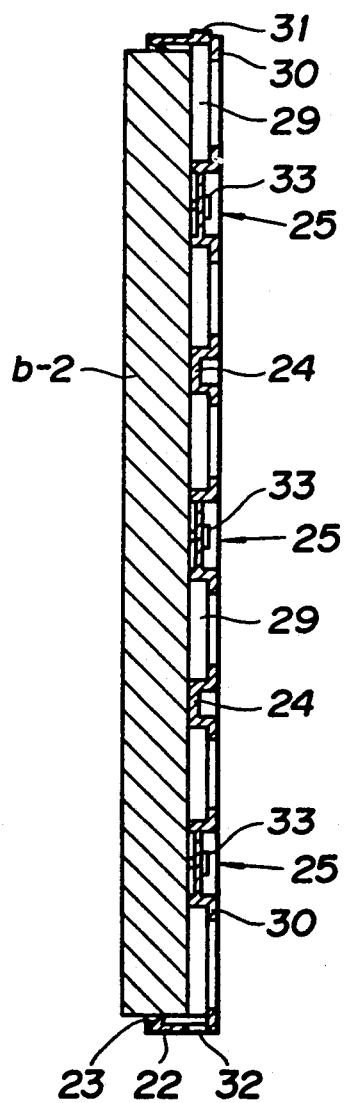

Furthermore, in each of the above holding sections 21, 21, 21, plate frames 24, 24 are arranged at the positions dividing into equal three parts in the section. As shown in FIG. 8, FIG. 10 and FIG. 13, these plate frames 24, 24 is constituted in a frame form by connecting the both edges to the long sides of the section walls 22, 22. The height of the plate frames is 10 mm and the width is 10 mm.

Then, in each of the above holding sections 21, 21, 21, as shown in FIG. 8, FIG. 9, FIG. 10, FIG. 12 and FIG. 13, a holder 25 of each wooden brick b-2 is arranged so as to be situated at the center lower part of three square zones which are divided by the above plate frames 24, 24. The above holders 25, 25 . . . are pedestals having a height of 10 mm and standing up from the bottom of the holding sections 21, 21. Namely, the height of the pedestals is equal to the height of the above plate frames 24, 24. Further, the upper surface of the above holders 25, 25 . . . have plane hollows 26, 26 . . . of which surrounding edges are left and the height is about 1 mm. As the result, the configuration of the above plane hollows 26, 26 . . . , as shown in FIG. 8, is similar to the plane configuration of the holders 25, 25 . . . . Two vis holes 27, 27 are passed through from the upper surface to the under surface of the above plane hollows 26, 26 . . . . Further, as shown in FIG. 8, eight arms 29, 29 . . . are protruded from the outer surroundings of each of the above holders 25, 25 at regular angles of 45° in radial directions, and these arms are joined to the lower parts of the section walls 22, 22 . . . or the above plate frames 24, 24, respectively.

Moreover, each plate for preventing sinking 30 is horizontally projected at the lower inside of the above section walls 22, 22 . . . , at both lower sides of the plate frames 24, 24 . . . , around the lower part of the holder and at both lower sides of the above arms 29, 29 . . . .

Figure 9:
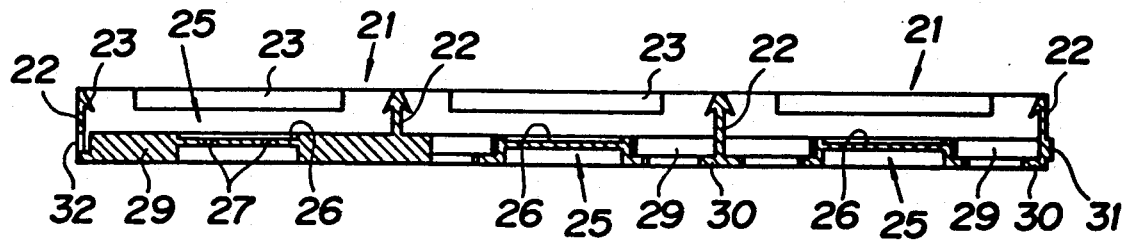
Figure 12:
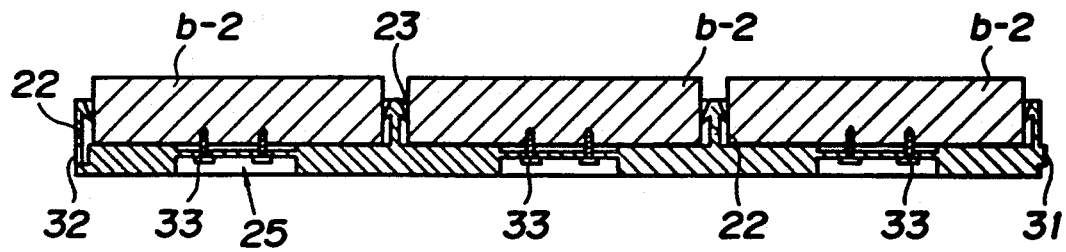

Then, as shown in FIG. 8 and FIG. 11, two joining projections 31, 31 are made on each of two adjacent sides which contain an angle and belong to four sides of the outer walls of the installing frame, respectively, and joining holes 32, 32 corresponding to the above joining projections 31, 31 are constituted on the other two sides, respectively. The above joining projections 31, 31 on one side are constituted on the section wall 22 (long side) or the section walls 22, 22 (short sides) of the above two square zones which are situated at the corners of the installing frame. Concerning the short sides of the holding section 21, these projections are naturally constituted on the section walls 22, 22 which are in common with the same outer wall of the installing frame. As shown in FIG. 9, FIG. 10 and FIG. 12, the joining projections 31, 31 are projected from the outer walls of the installing frame so as to be situated slightly above the thickness of the protrusions 30, 30 . . . for preventing sinking. The projection width is about 4 mm, slightly widen than the thickness of the outer wall, namely 2 mm. The thickness of a height direction is about 6 mm. Further, as shown in FIG. 8 and FIG. 11, the length of the direction along the outer walls of the above joining projections 31, 31 . . . is determined to be about 45 mm. The position of the direction is centered on the center point of the corresponding protrusion piece 23.

Moreover, the above joining halls 32, 32 of the side of the outer wall of the installing frame corresponding to the above joining projections 31, 31 are constituted on the other two sides, respectively. The above joining projections 31, 31 on the side are constituted on the section wall 22 (long side) or the section walls 22, 22 (short sides) of the above square zones which are situated at the corners of the installing frame. As shown in FIG. 9, FIG. 10 and FIG. 12, the joining holes 32, 32 are made at the outer wall of the installing frame so as to be situated above the thickness of the protrusions 30, 30 . . . for preventing sinking. The height from the hole bottom of the joining holes 32, 32 is slightly above 6 mm. Then, the length of the direction along the outer walls of the above joining holes 32, 32 . . . is slightly above the length of the corresponding direction of the above joining projections, namely slightly above 45 mm.

Furthermore, the above whole constitution elements are integrally molded out of plastics which are obtained by mixing a main polypropylene material, and a weathering agent and the like.

In this embodiment, as the installing frame is constituted as described above, the frame is used as described in the above first example and has the same action and effect except that the wooden bricks b-2, b-2 . . . having the plane rectangular configuration are held by the holding sections 21, 21 . . . .

Moreover, in this embodiment, concerning the size of the installing frame, the wooden bricks b-2, b-2 which are formed in plane rectangular configuration having a short side of 100 mm, a long side of 320 mm and a height of 40 mm are suitable for the holding object.

Before the installing frames are installed on sidewalks and the like, the wooden bricks b-2, b-2 are inserted and held in the holding sections 21, 21, respectively.

These steps, the action of each constitution element of the installing frame, and the like are the same as those of the first example.

FIG. 11 shows that the plane rectangular wooden brick b-2 is held on each of the holding sections 21, 21, 21 of the installing frame in the same steps described in the first example. FIG. 13 shows that the wooden bricks b-2, b-2, b-2 which are placed on the holder 25, 25 . . . are fixed by screwing the vis 33, 33 inserted through the vis holes 7, 27 . . . . Further, in this example, as shown in FIG. 13, both of the plate frames 24, 24. . . and the holders 25, 25, 25 act as pedestrias which place the wooden brick b-2.

The instalating construction of sidewalks and the like begins by building a groundwork of gravel or concrete.

The building of the above ground is conducted as described in the first example.

The steps for installing the wooden bricks b-2, b-2 . . . to the ground after the bricks are held in the installing frame, and the action and effect are the same as those of the first example.

Then, an example of the second invention is briefly explained.

Figure 14:
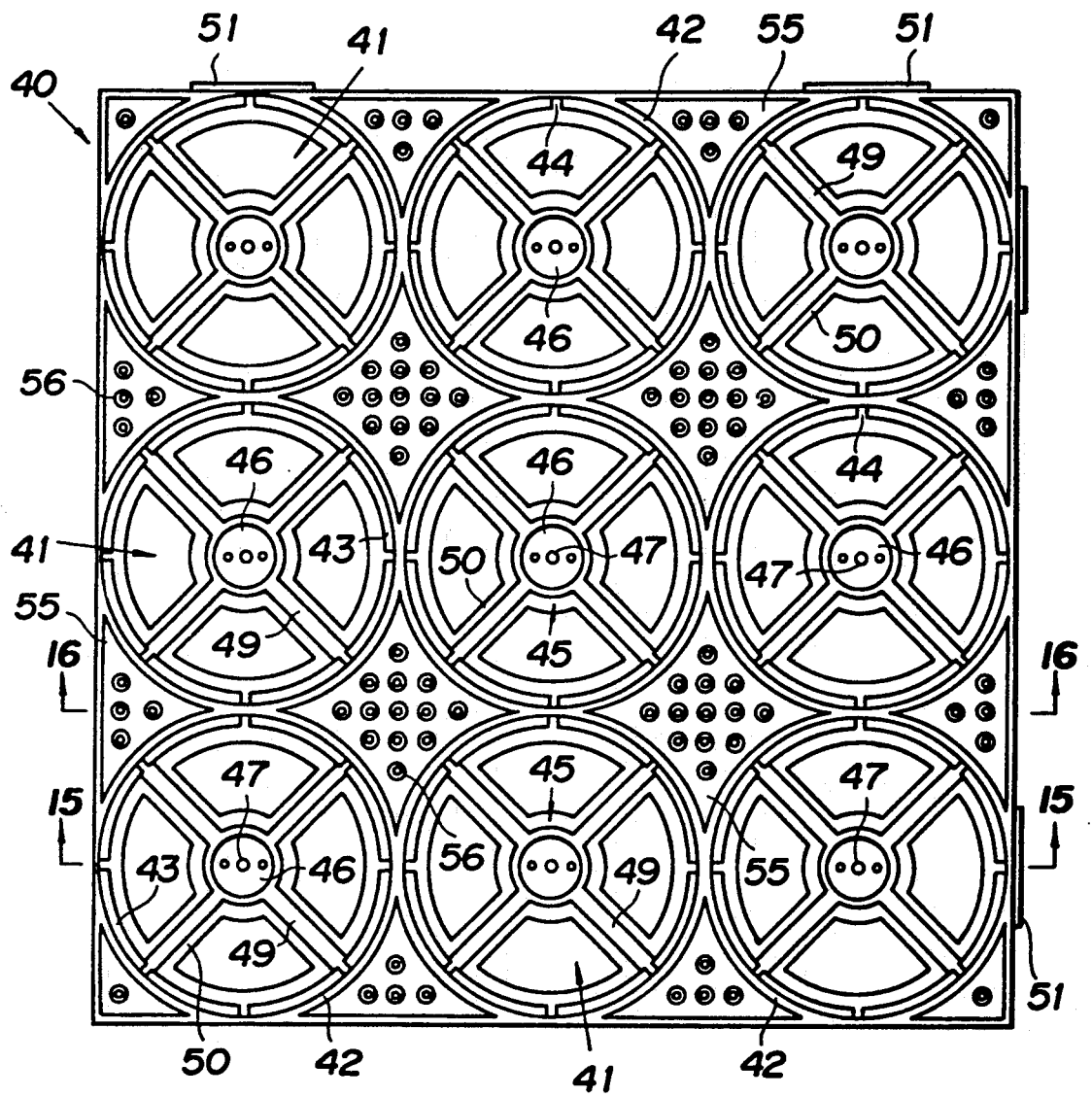
FIGS. 14 to 18 show a working example of the second invention of the present inventions.

As shown in FIG. 14, an installing frame in which nine holding sections 41, 41 . . . having plane round shapes are arranged in three perpendicular and three lateral lines is constituted in a frame 40. The above holding sections 41, 41 . . . are held in the frame 40 by the surrounding connection plates 55, 55 . . . . The frame 40 is constituted by the above connection plates 55, 55 . . . and the outer walls of outer edges, and the holding sections 41, 41 . . . are arranged in the frame as described above.

The frame 40 of the installing frame, as described in the above two examples, is also constituted in a plane square having a side of 330 mm, the thickness of the outer wall is 2 mm, and the height is 40 mm. Further, the inside diameter of the above holding sections 41, 41 . . . is 106 mm, respectively.

Figure 15:
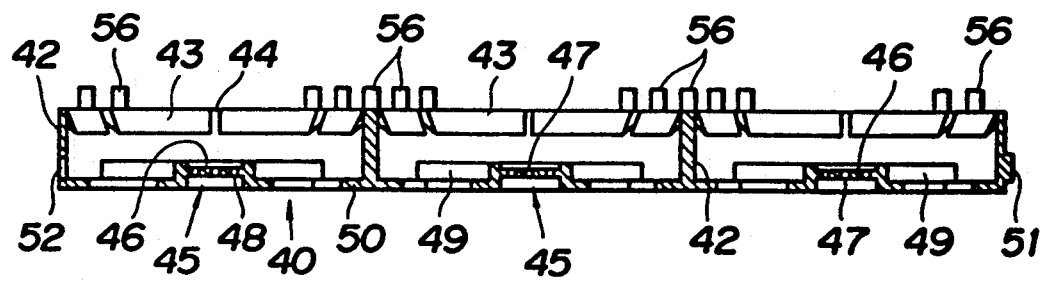
Figure 17:
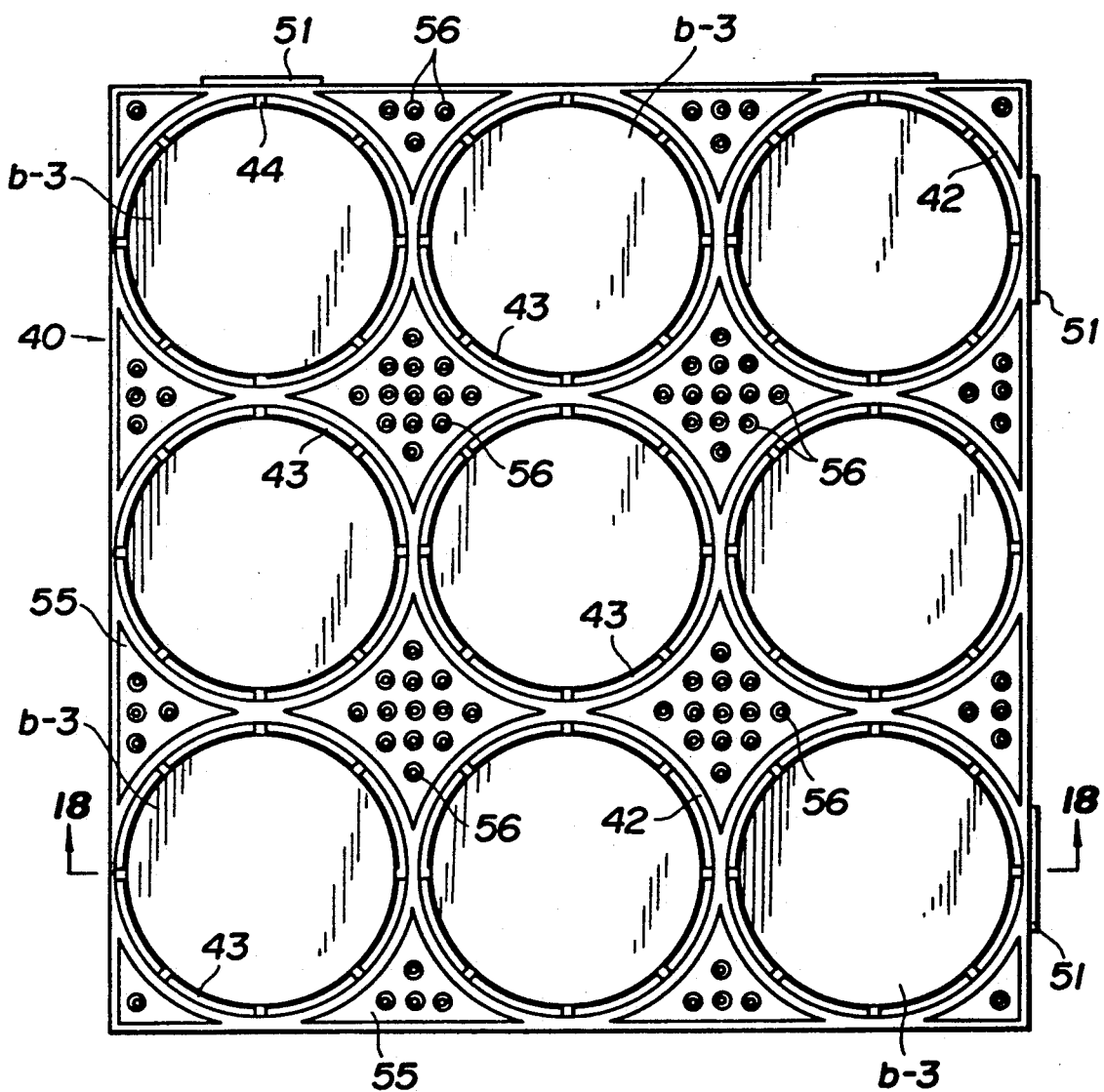

Each of the above holding sections 41, 41 . . . is surrounded by a section surrounding wall 42 having a ring shape. The thickness of the section surrounding walls 42, 42 . . . is 2 mm. Further, on the section surrounding wall 42 of the above holding sections 41, 41 . . . , as shown in FIG. 14, FIG. 15, FIG. 17 and FIG. 18, a protrusion piece 43 is protruded from the top into an oblique downward direction of the section, respectively. The width of the protruded direction of the above protrusion pieces 43, 43 . . . is 10 mm, and the angles between the protrusion pieces and the section surrounding walls 42, 42 . . . are about 30°. As the result, the lower edge of the protrusion pieces 43, 43 . . . are protruded in the direction of the section center in about 5 mm. Further, as shown in FIG. 14, FIG. 15 and FIG. 17, eight notches 44, 44 . . . for penetrating water at regular angles of 45° are formed in the above protrusion pieces 43, 43 . . . .

Figure 18:
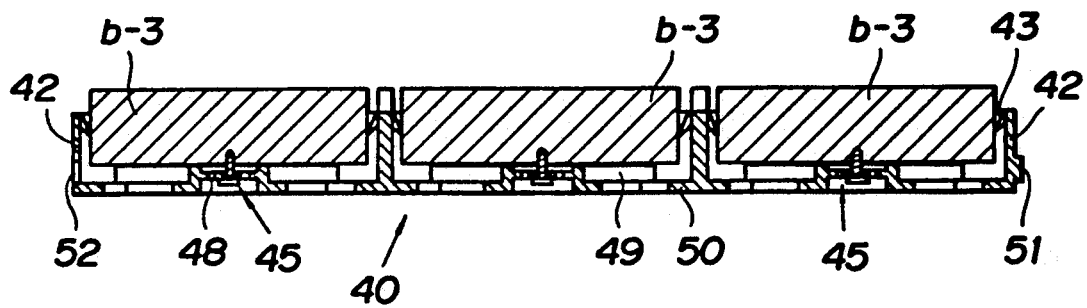

At the lower center of each of the above holding sections 41, 41 . . . , as shown in FIG. 14, FIG. 15 and FIG. 18, a holder 45 of each wooden brick b-3 is arranged so as to stand up. The above holders 45, 45 are circular pedestals which stands up in a height of about 10 mm from the bottom of the holding sections 41, 41 . . . . Moreover, the upper surface of the holders 45, 45 . . . have round hollows 46, 46 . . . of which surrounding edges are left and the height is about 1 mm. A vis hole 47 is made at the center of each of the above round hollows 46, 46 . . . so as to pass through the upper surface and the under surface. Further, two small joining holes 48, 48 which are arranged on a straight line with the above vis hole 47 are made around the vis hole. As shown in FIG. 14, four arms 49, 49 . . . are protruded from the surrounding of the above holder 45 at regular angles of 90°, and these arms are joined to the inside of the section surrounding wall 42 of the holding section 41.

Moreover, a protrusion 50 for preventing sinking of the wooden bricks is horizontally projected around the lower part of the above holders 45, 45 . . . , at both lower sides of the above arms 49, 49 . . . and at the lower inside of the above section surrounding walls 42, 42 . . . , respectively.

Figure 16:
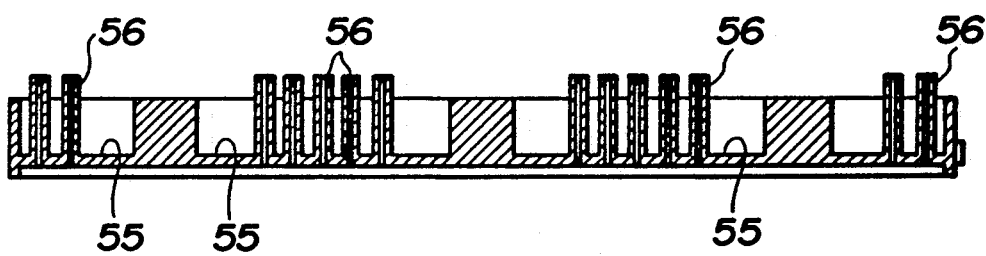

Then, as shown in FIG. 14, FIG. 16 and FIG. 17, many elastic tubes 56, 56 for stepping and pressing are provided on connection plate 55 for connecting each of the holding sections 41, 41 to the above arrangement. The top of the tube 56, 56 . . . for stepping and pressing is determined so as to have almost same height as the top of the wooden bricks b-3, b-3 . . . which are inserted and held in the holding sections 41, 41 . . . . In this example, the height of the tube 56, 56 . . . is 50 mm from the top to the bottom of the installing frame.

On the contrary, as shown in FIG. 14, FIG. 15, FIG. 17 and FIG. 18, two joining projections 51, 51 are projected on each of two adjacent sides which contain an angle and belong to four sides of the outer walls of the above frame 40, respectively, and corresponding joining holes 52, 52 are made on the other two sides. The above joining projections 51, 51 on one side are formed on the outer wall which partly overlaps on the section surrounding walls 42, 42 of the holding sections 41, 41 situated at the corner of the frame 40. Then, as shown in FIG. 15 and FIG. 18, the joining projections 51, 51 are projected from the outer wall of the frame 40 so as to be situated slightly above the thickness of the protrusions 50, 50 . . . for preventing sinking. The projection width is about 4 mm, slightly wider than the thickness of the outer wall, namely 2 mm. The thickness in a height direction is about 6 mm. Further, as shown in FIG. 14 and FIG. 17, the length of the direction along the outer walls of the above joining projections 51, 51 . . . is determined to be about 45 mm.

Moreover, the above joining holes 52, 52 of the side of the outer wall of the frame 40 are arranged so as to correspond to the above joining projections 51, 51, and these holes are made on the outer wall which overlaps on the section walls 42, 42 of the holding sections 41, 41 situated at the corner of the frame 40. As shown in FIG. 15 and FIG. 18, the joining holes 52, 52 are made at the outer wall of the frame 40 so as to be situated above the thickness of the protrusions 50, 50 for preventing sinking. The height from the lower part of the joining holes 52, 52 is slightly above 6 mm. Then, the length of the direction along the outer walls of the above joining holes 52, 52 . . . is slightly above 45 mm.

Furthermore, the above whole constitution elements are integrally molded out of plastics which are obtained by mixing a main polypropylene material, and a weathering agent and the like.

In this embodiment, as the installing frame is constituted as described above, as explained in the following, the frame can be used by holding for the pavement of sidewalks and the like, the wooden bricks b-3, b-3 . . . having the plane round configuration in the holding sections 41, 41 . . . . The plane round wooden bricks b-3, b-3 . . . having a diameter of 100 mm and a thickness of 40 mm are suitable for the holding object.

Before the installing frames are installed on sidewalks and the like, the wooden bricks b-3, b-3 . . . are inserted and held in the holding sections 41, 41 of the installing frames, respectively. The steps and the action and effect which are caused by each constitution element of the installing frame are the same as those of two examples of the first invention.

Then, FIG. 17 shows the installing frame in which the wooden bricks b-3, b-3 . . . . FIG. 18 shows a condition in which the wooden bricks b-3, b-3 . . . are inserted in the holding sections 41, 41 . . . and fixed on the holder 45, 45 . . . with the vis 53, 53 . . . .

Further, the ground constitution of the necessary installing zone of sidewalks and the like is the same as that of two examples as described above.

The steps for installing the frame which holds the wooden bricks b-3, b-3 on the ground are also identical with those of the first example of the present invention.

The actions and effects of the installing frame are almost identical with those of the above example of the present invention.

Differences are as follows.

In this example, as the tubes 56, 56 . . . for stepping and pressing are provided on the connection plates 55, 55 . . . between the holding sections 41, 41 . . . , pedestrians can walk and cars can run on the plates, and it is unnecessary especially to fill up the gaps which exist between the plane round holding sections 41, 41 . . . . Further, as the tubes 56, 56 . . . for stepping and pressing are passed through the plates, rainwater and the like can be allowed to flow on the ground.

INDUSTRIAL APPLICABILITY

According to the installing frames of the present invention, the pavement of wooden bricks can be simply and efficiently finished by holding the wooden bricks in the frames and then by installing the frames on the sidewalks to be built in parks, common roads, parking places and the like. Furthermore, the pavement by using the wooden bricks which are finished by such a way, can be obtained a smooth road surface, can permit the expansion and contraction of wooden bricks, and can have good water permeability.

I claim:

1. A frame for installing wooden paving blocks, comprising:

a plurality of juxtaposed sections and each having a peripheral shape for holding a wooden paving block, said sections being arranged in a predetermined pattern, each of said plurality of sections being defined by a peripheral wall;

fixing means provided in each section for fixing a wooden paving block in the section, the peripheral wall for the section extending upwardly above said fixing means to a height such that when a wooden paving block is in position in a section, it will project at least slightly above the peripheral wall of the section; and an elastic protruding piece provided around at least a portion of the peripheral wall of each section, said protruding piece projecting downwardly and inwardly into the interior of the section and having a free end spaced from the inner surface of the peripheral wall which is resiliently movable toward and away from the inner surface of the peripheral wall for being engaged by the edge of a wooden paving block positioned in the section and moving resiliently for accommodating changes in the shape of a wooden paving block in the section.

2. A frame as claimed in claim 1 in which said fixing means comprises a circular support member provided substantially in a center of the bottom of each of said plurality of sections, and arms connected between said circular support member and the peripheral wall of the section, said arms having spaces therebetween opening out of the bottom of the section, said circular support member having a hole therethrough for inserting a screw therethrough into a wooden paving block for securing a wooden paving block in the section.

3. A frame as claimed in claim 1 in which said frame is integrally molded from a resilient plastic.

4. A frame as claimed in claimed in claim 1 in which said protruding pieces each have a water drainage hole therethrough.

5. A frame as claimed in claim 1 in which said sections are rectilinear in shape, and are juxtapositioned in a pattern which is rectilinear, the portions of the peripheral walls of the juxtaposed sections around the outer periphery of the pattern constituting an outer wall.

6. A frame as claimed in claim 5 in which the thickness of said outer wall is half the thickness of the remainder of the peripheral walls.

7. A frame as claimed in claim 1 in which said sections are round in shape and said frame further comprises an outer wall having a rectilinear shape and surrounding said sections.

8. A frame as claimed in claim 7 in which said frame has spaces between said sections and between said sections and said outer wall, and said frame further comprises upwardly extending elastic projections in said spaces which extend upwardly to the same level as the upper surface of wooden paving blocks in said sections.

* * * * *